E. R. LANCASTER.
HORSE-POWERS.
No. 194,156. Patented Aug. 14, 1877.
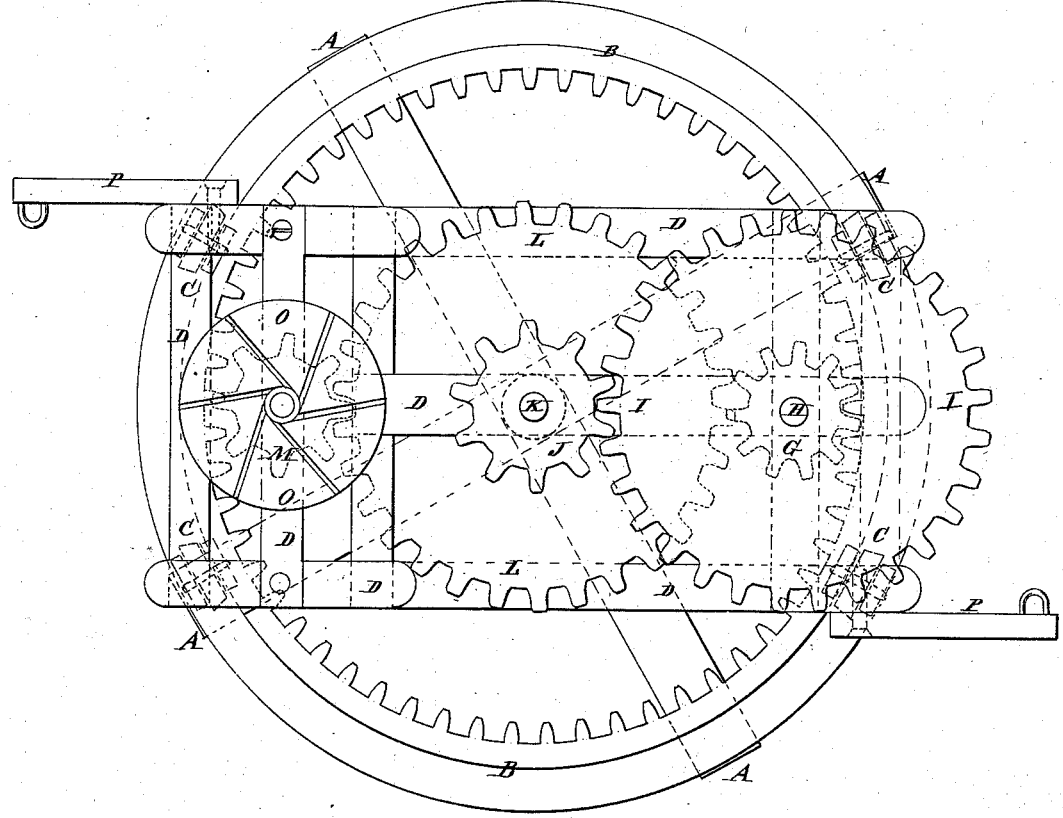
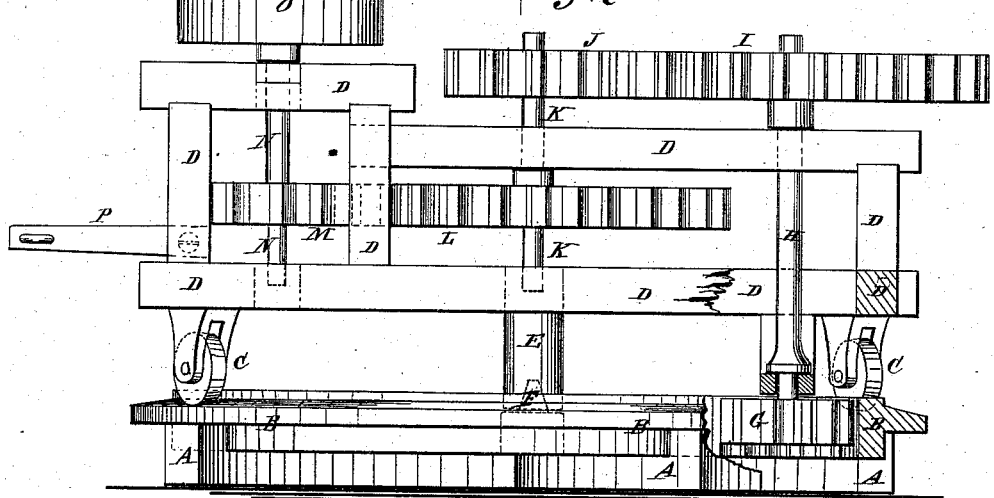
WITNESSES:
A. W. Almqvist
J. H. Scarborough
INVENTOR:
E. R. Lancaster
BY Munn & Co.
ATTORNEYS.

UNITED STATES PATENT OFFICE.

EDWIN R. LANCASTER, OF ALUM MILLS, VIRGINIA.

IMPROVEMENT IN HORSE-POWERS.

Specification forming part of Letters Patent No. 194,156, dated August 14, 1877; application filed June 25, 1877.

*To all whom it may concern:*

Be it known that I, EDWIN R. LANCASTER, of Alum Mills, in the county of Washington and State of Virginia, have invented a new and useful Improvement in Horse-Power Mills, of which the following is a specification:

Figure 1 is a top view of my improved machine. Fig. 2 is a side view of the same, part being broken away to show the construction.

Similar letters of reference indicate corresponding parts.

The object of this invention is to furnish an improved horse-power mill which shall be so constructed as to economize space without sacrificing power or effectiveness, and which shall be simple in construction and convenient in use.

The invention will first be described in connection with the drawings, and then pointed out in the claim.

A is the base-frame of the machine, to which is attached a large internally-toothed gear-wheel, B. The upper side of the gear-wheel B is made wide and smooth, to serve as a way for the small wheels or rollers C, pivoted to the corners of the frame D. To the center of the frame D is attached a post, E, the lower end of which revolves upon a pivot, F, attached to the center of the frame A.

G is a small gear-wheel, the teeth of which mesh into the teeth of the large gear-wheel B, and which is attached to the lower end of the shaft H.

The shaft H revolves in bearings attached to one end of the frame D, and to its upper end is attached a large gear-wheel, I, the teeth of which mesh into the teeth of the small gear-wheel J, attached to the upper end of the shaft K. The shaft K revolves in bearings attached to the middle part of the frame D, and to it is attached a large gear-wheel, L, the teeth of which mesh into the teeth of the small gear-wheel M, attached to the shaft N. The shaft N revolves in bearings attached to the frame D, and to its upper end is attached a grinding-mill, O, which is thus carried around by and with the frame D, and no more space will be required than enough for the driving mechanism, and a neat and compact machine is produced.

To the diagonal corners of the lower part of the frame D are attached the sweeps P, to which the horses are attached.

By this construction the machine will be evenly balanced, so that it will run steadily and easily.

Having thus described my invention, I claim as new and desire to secure by Letters Patent—

The combination, with base-frame, having internal stationary wheel B, of a wheel-frame, D, revolving thereon, the mechanism G H I J K L M N, and the mill O, all arranged on the inside of sweeps P, as shown and described.

EDWIN R. LANCASTER.

Witnesses:
L. M. WITHERS,
J. F. MINNICK.